United States Patent [19]
Ho

[11] Patent Number: 5,531,412
[45] Date of Patent: Jul. 2, 1996

[54] UNIVERSAL CAMERA SUPPORTING JIBS

[76] Inventor: Kuan-Jen Ho, 1 Fl., No. 8, Alley 3, Lane 60, Wenlin N. Rd., Peitou Dist., Taipei, Taiwan

[21] Appl. No.: 308,379

[22] Filed: Sep. 19, 1994

[51] Int. Cl.$^6$ ............................................. F16M 13/00
[52] U.S. Cl. ............................. 248/123.2; 248/177.1; 248/281.11; 354/293
[58] Field of Search ........................ 248/123.1, 183, 248/184, 280.1, 281.1, 292.1; 352/243; 354/81, 293; 74/490.3, 521; 414/917; 901/48; 212/196, 197; 280/47.11

[56] References Cited

U.S. PATENT DOCUMENTS

| | | | |
|---|---|---|---|
| 2,306,562 | 12/1942 | Phillips | 248/183 |
| 2,548,476 | 4/1951 | Horstmann | 248/281.1 |
| 3,995,756 | 12/1976 | Hjelm | 414/917 |
| 4,335,315 | 6/1982 | Waerve et al. | 248/281.1 |
| 4,657,220 | 4/1987 | Lindsay | 352/243 |
| 4,702,450 | 10/1987 | Barisa | 248/292.1 |
| 4,849,778 | 7/1989 | Samuelson | 248/281.1 |
| 5,192,963 | 3/1993 | Hill | 248/281.1 |

FOREIGN PATENT DOCUMENTS

| | | | |
|---|---|---|---|
| 2557266 | 6/1985 | France | 74/521 |
| 3706530 | 10/1987 | Germany | 248/183 |
| 1324843 | 7/1987 | U.S.S.R. | 901/48 |

Primary Examiner—Leslie A. Braun
Assistant Examiner—Richard M. Smith
Attorney, Agent, or Firm—Ross, Clapp, Korn & Montgomery

[57] ABSTRACT

A universal camera supporting jib is disclosed to have a tripod, a base horizontally rotatably fixed on the tripod, first arm and a second arm vertically pivotably fixed on the base and respectively define a long and a short portion. A large and a small four-link mechanisms are respectively formed by means of the long and small portion of the first and second arms. A camera is mounted on an end of one link of the large four-link mechanism, wherein the link is parallel to the second arm. A counter balance weight for balancing the weight of the camera is mounted on an end of one link of the small four-link mechanism, wherein the link is also parallel to the second arm. When the position of the camera is changed the position of the counter balance weight is changed accordingly through the cooperative action between the two four-link mechanisms thereby to balance the weight of the camera.

6 Claims, 10 Drawing Sheets

12,531,412

UNIVERSAL CAMERA SUPPORTING JIBS

BACKGROUND OF THE INVENTION

The present invention is related to a universal camera supporting jib, and, more particularly, to a universal camera supporting jib having two four-link mechanisms which can be easily manipulated to adjust the spatial coordinate of the camera thereon to the desired position.

Nowadays, due to the requirements of high quality information communication (audio and video), television stations are set around the world. Sometimes, the information is transmitted by means of satellites. The pictures shown on the televisions originate from camera crews who use video cameras to obtain them. Conventionally, depending on the mounting and operating conditions, the supporting systems for the cameras are classified into two types: the pedestal cameras and the crane cameras. Both of the two types have their respective disadvantages.

The mobility of the pedestal cameras are restricted. The camera thereof is generally rotatably fixed on the pedestal and has restricted movement. Alternatively, although the crane cameras can have a better mobility, they need operators to move them along rails; furthermore, since the crane is constructed in the manner like that of a seesaw, when the camera thereof is lifted or lowered, it can only have a curved locus. Moreover the construction thereof is relatively complicated and heavy.

In some cases, in order to take the on-the-spot pictures or pictures having better viewing angles the camera crews use light-weight Electronic News Gathering cameras (i.e., hand or shoulder cameras) to take pictures. Although, modern light-weight pictures camera are very portable, to put them on the shoulder for a long time also will cause discomfort to the camera operators. Furthermore, the pictures obtained by light-weight cameras are not always of high quality and are sometimes unstable.

To overcome the disadvantages and inconvenience of the prior art camera supporting systems, the present invention is proposed to have a unique universal camera supporting jib which can easily fix the camera in the space and adjust the coordinates of the camera to the desired position.

SUMMARY OF THE INVENTION

The present invention provides a universal camera supporting jib which comprises a tripod, a base horizontally rotatable relative to the tripod, a first and a second arm respectively vertically pivotably mounted on the base and respectively define a long and a short portion. Two four-link mechanisms are formed by means of the first and second arm and other links. The first arm is longer than the second arm. A four-link mechanism is formed by means of the long portions respective of the first and second arm. (In the following this four-link mechanism is defined as "large four-link mechanism".) The other is formed by means of the short portions. (In the following this is defined as "small four-link mechanism".) A camera mounting bracket is attached to an end of one link of the large four-link mechanism, wherein the link is spaced from and parallel to the second arm and the end that the camera mounting bracket is attached to is other than the end of the link connecting with the first arm. Furthermore, a counter balance weight for balancing the weight of the camera is provided on an end of a link of the small four-link mechanism, wherein the link is also spaced from and parallel to the second arm and the end that the counter balance weight is provided is other than the end that the link is connected to the first arm. By properly choosing the weight of the counter balance weight and the size of the large and small four-link mechanism and by the inherent characteristic of two four-link mechanisms, a balanced state is obtainable between the camera and the counter balance weight. This means that the camera can be automatically fixed on its position without the necessity to exert any external force on the present universal camera supporting jib to support the camera. Thus, when a camera crew member wants to manipulate the present universal camera supporting jib to change the position of the camera, he only needs to simply exert a small amount of force on the camera mounting bracket upwards, downwards, forwards or backwards or horizontally rotate it about the tripod via the base, whereby he can easily adjust the three-dimensional coordinates of the camera to the desired position through the cooperative relationship between the large and small four-link mechanism. Due to the extendible and retractable characteristics of four-link mechanisms, the camera mounted on the present universal camera supporting jib can be moved over a large range of space; furthermore, the present universal camera supporting jib can be retracted to have a compact volume to facilitate its storage and transportation.

It is an object of the present invention to provide a universal camera supporting jib that the camera can be easily fixed in its desired position without the necessity to exert a large amount of force to support the camera.

It is a further object of the present invention to provide a universal camera supporting jib which can be easily manipulated to change the position of the camera from one place to another.

It still is a further object of the present invention to provide a universal camera supporting jib which can be extended a sufficiently long distance to move the camera over a large range of space.

It still is a further object of the present invention to provide a universal camera supporting jib which can be retracted to have a compact volume to facilitate its storage and transportation.

It still is a further object of the present invention to provide a universal camera supporting jib which has a relatively simple structure and low cost.

Other objects, advantages, and novel features of the invention will become more apparent from the following detailed description when taken in conjunction with the accompanying drawings.

DESCRIPTION OF THE PREFERRED EMBODIMENT

Figure 1A:
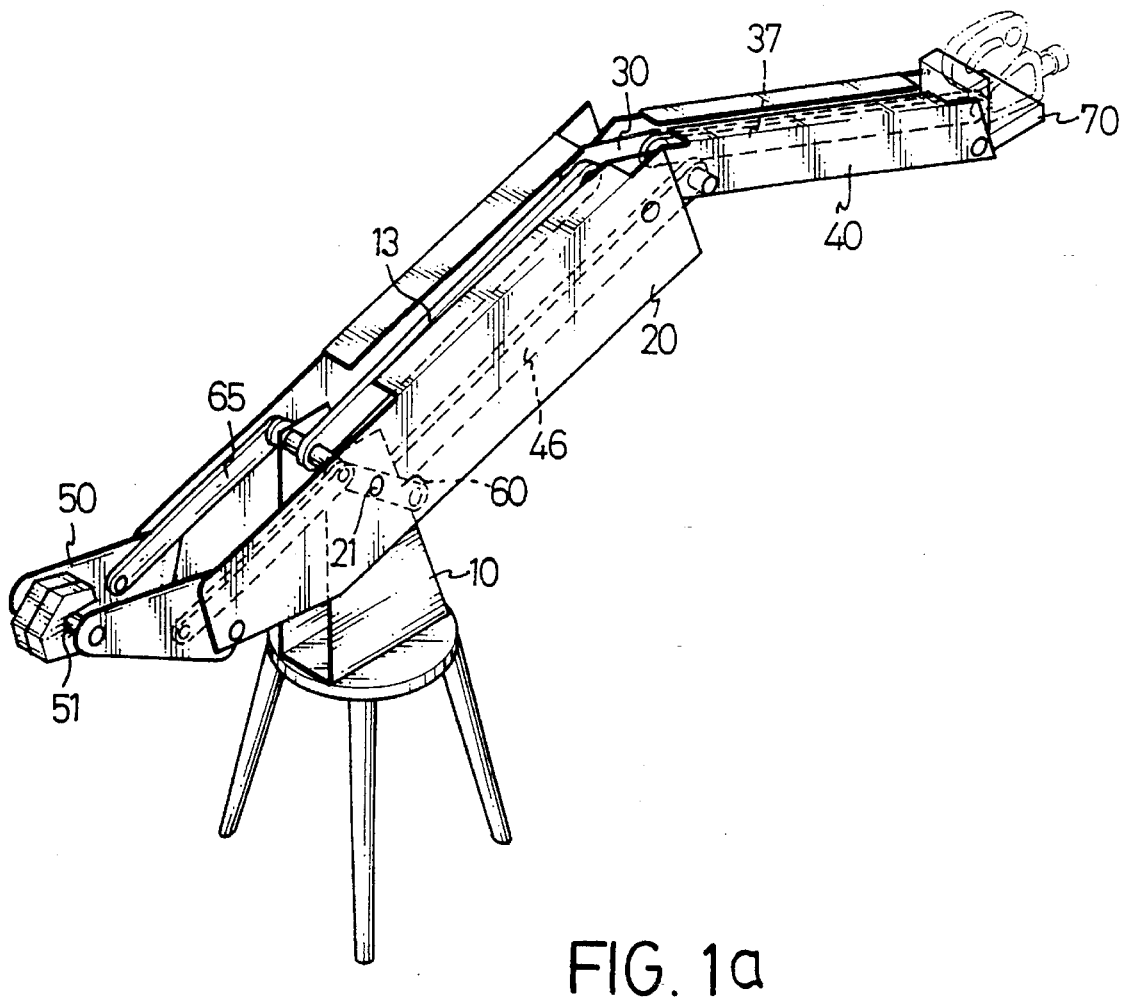
FIG. 1a is a left-front-top perspective view showing a preferred embodiment of the universal camera supporting jib according to the present invention, wherein some elements and the camera are indicated by phantom lines.
Figure 1B:
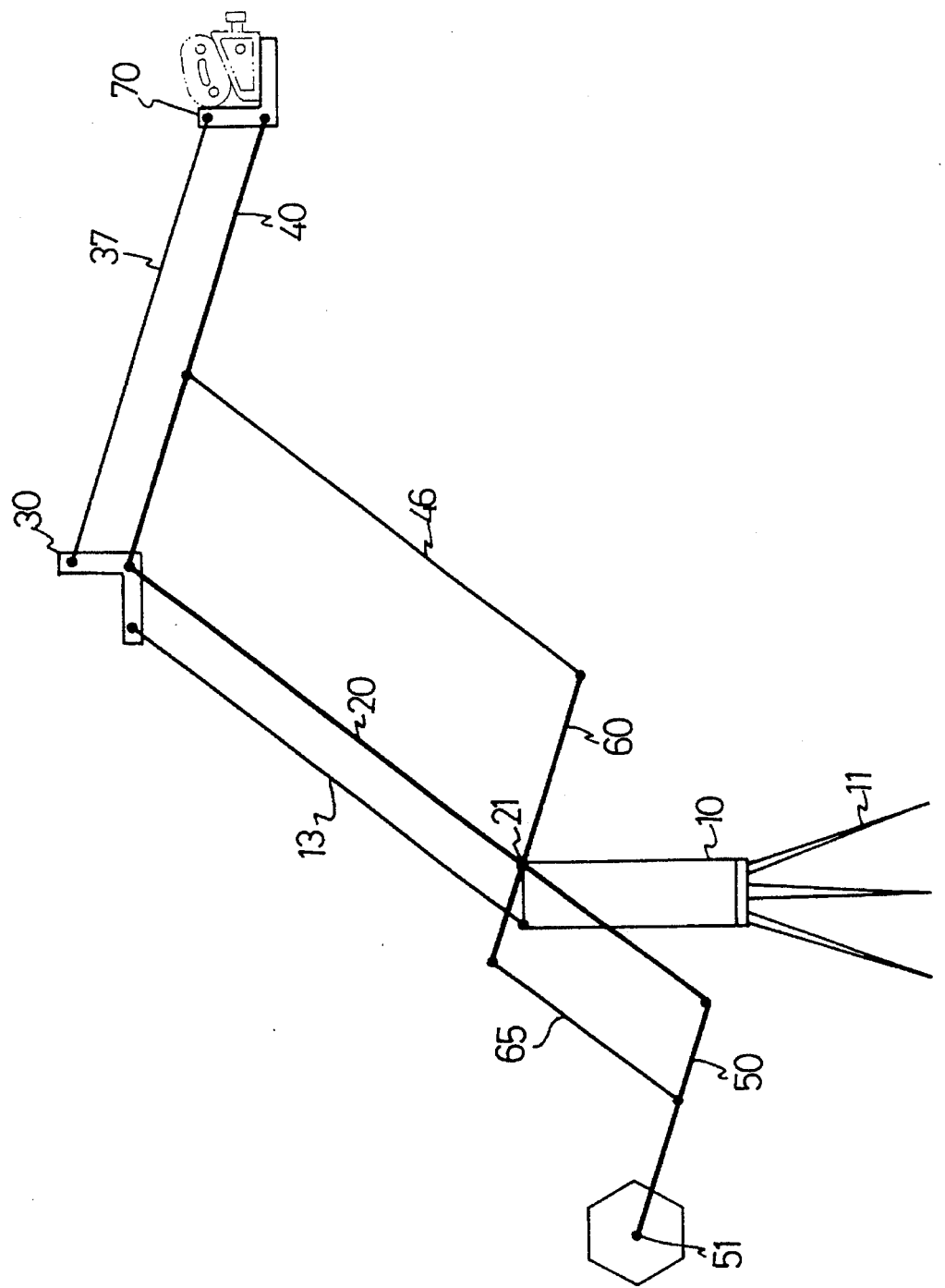
FIG. 1b is a diagrammatic front plane view of FIG. 1a representing the structural outline of the universal camera supporting jib.
Figure 2A:
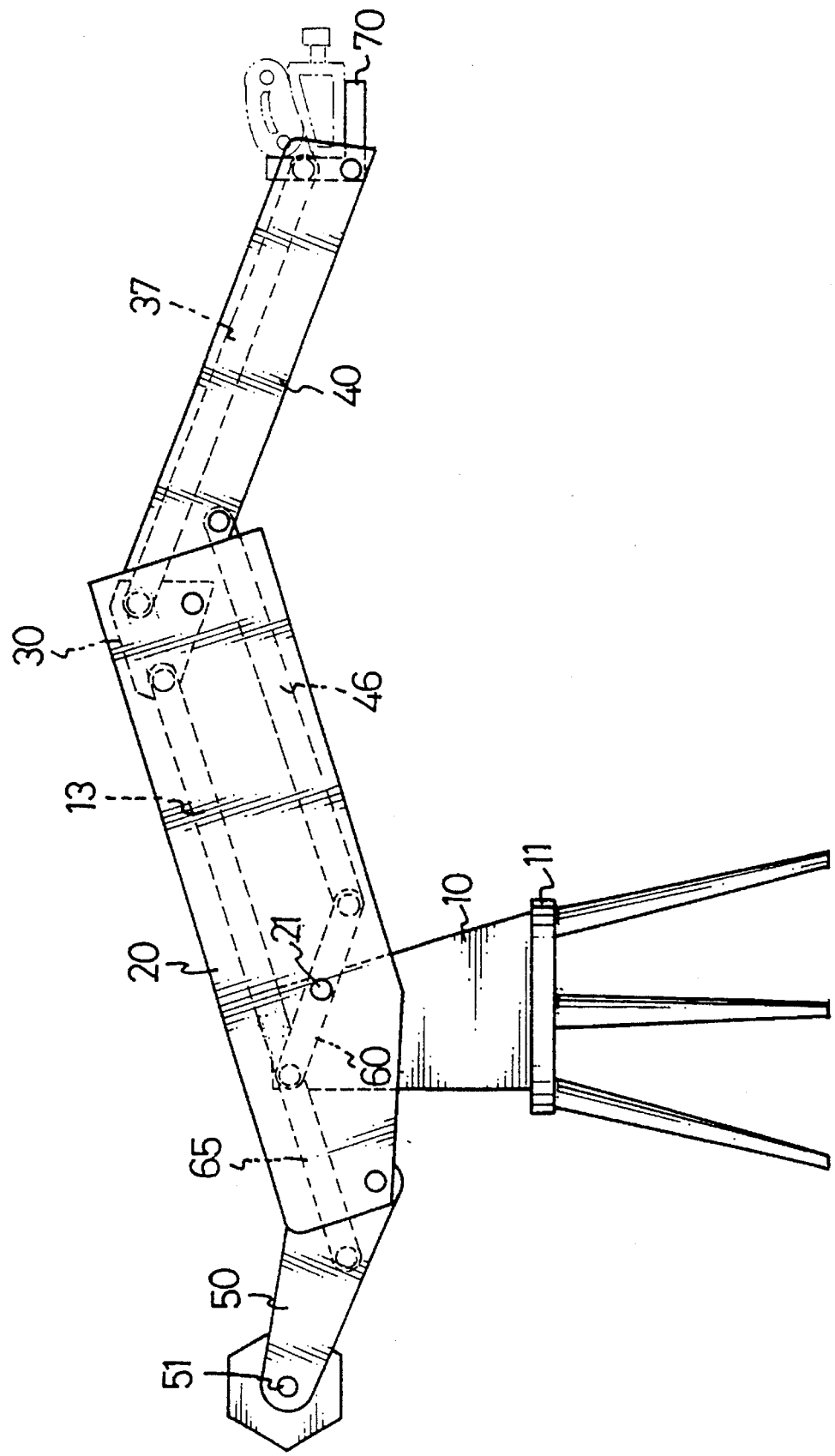
FIG. 2a is a front plane view of FIG. 1a showing the universal camera supporting jib in an extended configuration, wherein some elements and the camera are indicated by phantom lines.
Figure 2B:
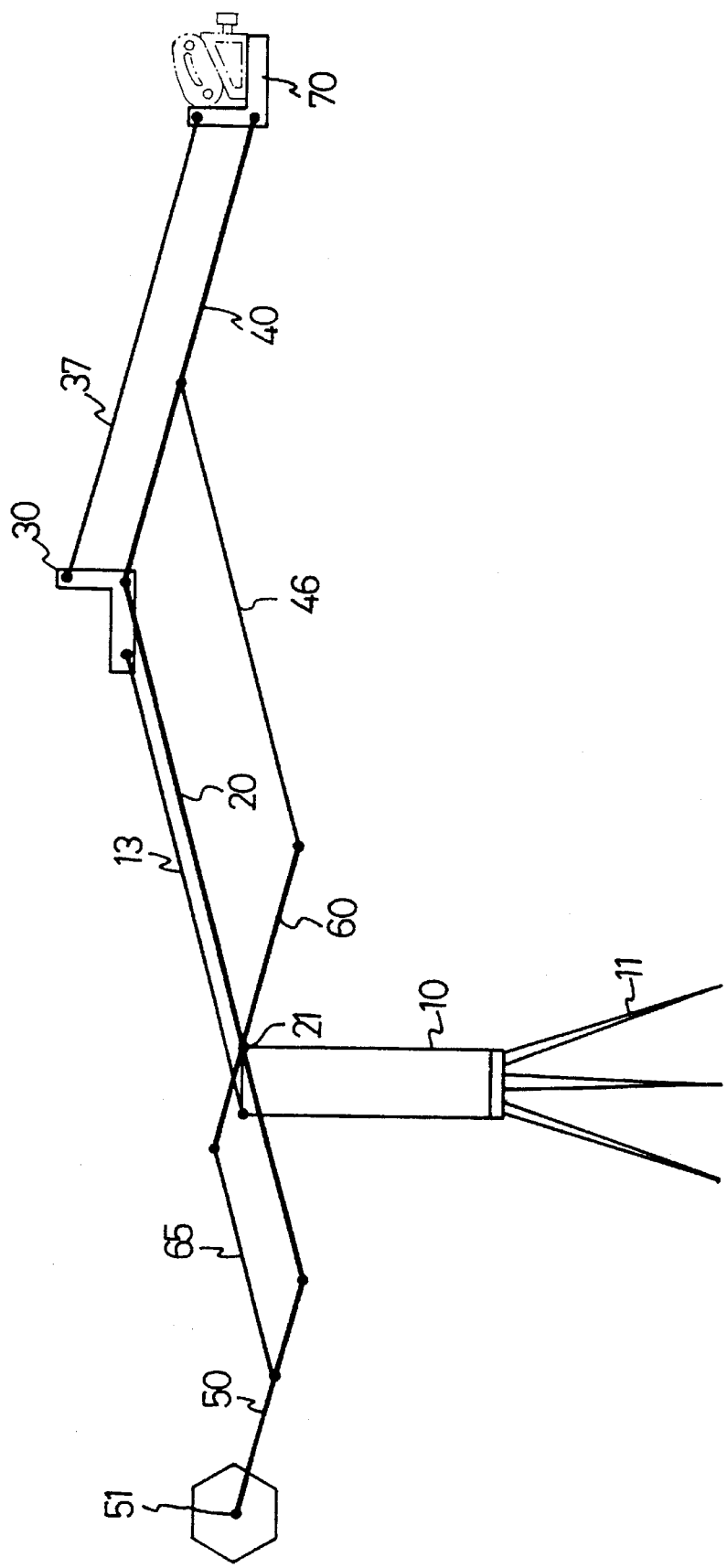
FIG. 2b is a diagrammatic view of FIG. 2a representing the structural outline of the universal camera supporting jib.
Figure 3A:
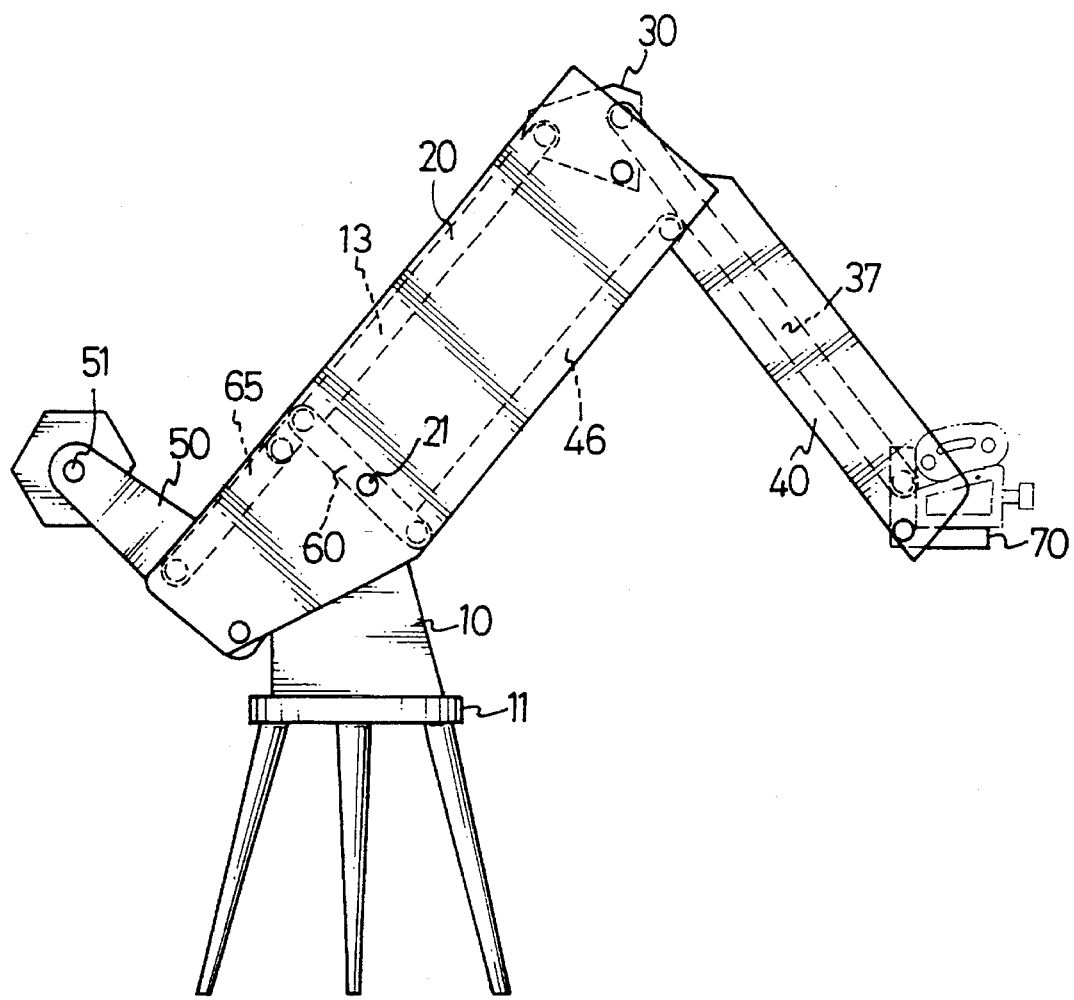
FIG. 3a is a view similar to FIG. 2a but showing the universal camera supporting jib in a retracted configuration.
Figure 3B:
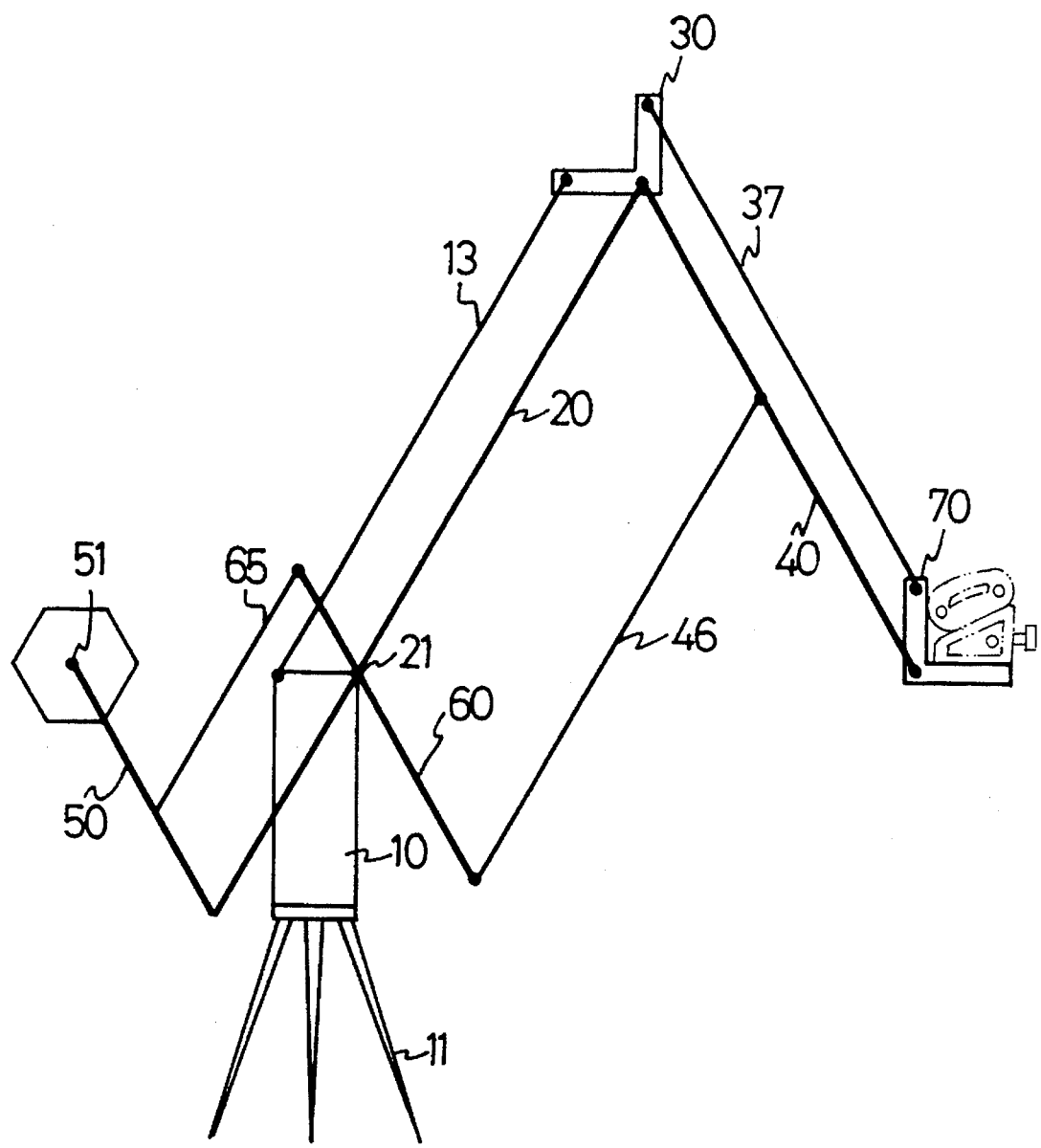
FIG. 3b is a diagrammatic view of FIG. 3a representing the structural outline of the universal camera supporting jib.

Please refer to FIG. 1a and 1b which respectively show a perspective view and diagrammatic view of structural outline of the universal camera supporting jib of the present invention. The present universal camera supporting jib comprises a tripod 11, a generally U-shaped base 10 rotatably and upright mounted on the tripod 11, a first arm 20 and a second arm 60 pivotably connected to the base via a shaft 21 or the like fixedly mounted on side walls of the U-shaped base 10. The shaft 21 forms a vertical pivoting axis for the first arm 20 and second arm 60 relative to the base 10. The first arm 20 which is composed of two L-shaped plates is positioned outside of and surrounding the base 10 and second arm 60. Thus, parts of the base 10 and the second arm 60 are shown by phantom lines in FIG. 1. The second arm 60 has a size far smaller than the first arm 20, and is composed of two plates.

For convenience of explanations, in the following disclosures, a front end of an element means the right side of the element as seen from the drawings. Similarly, a rear end means the left side.

A front end of the first arm 20 is pivotably connected to a joint 30 which is used to pivotably connect two rods 13 and 37. A rear end of the rod 13 is hinged to the base 10, and a front end of the rod 37 is pivotably connected to a L-shaped camera mounting bracket 70. The length of the rod 13 is the same as that of the first arm 20 from the point connecting it with the shaft 21 to its front end where it connects with the joint 30.

A link 40 which is composed of two L-shaped plates is pivotably connected with the front end of the first arm 20 and the joint 30 and extends forwardly. A front end of the link 40 is pivotably connected to the camera mounting bracket 70. The link 40 and the rod 37 have the same length. The link 40 is positioned outside of and surrounding the rod 37 and has a size larger than the rod 37; thus, the rod 37 is shown by phantom lines in FIG. 1a. A camera (not labeled) which is shown by phantom lines is mounted on the camera mounting bracket 70.

A link 46 has a length the same as that of the rod 13. A rear end of the link 46 is pivotably connected to a front end of the second arm 60. A front end of the link 46 is pivotably connected to the link 40 on a point where the length of the link 40 from the point to the end connecting it with the joint 30 is the same as that of the second arm 60 from the point connecting it with the shaft 21 to its front end. Thus, a four-link mechanism is formed by the link 46, the second arm 60, the first arm 20, and the link 40. Hereafter, for convenience, this four-link mechanism is referred as "large four-link mechanism". From the drawings, it can be clearly seen that the link 46 is spaced from and parallel to the first arm 20, and, the link 40 is spaced from and parallel to the second arm 60. By the large four-link mechanism, when the link 40 is pivoted about the first arm 20, the link 46 is moved to pivot the second arm 60 about the shaft 21 to change the relative angle between the first arm 20 and second arm 60.

A counter balance weight supporting link 50 which is used to support a counter balance weight 51 is pivotably connected to a rear end of the first arm 20. A link 65 has a length the same as that of the first arm 20 from the point connecting it with the shaft 21 to its rear end. A front end of the link 65 is pivotably connected to a rear end of the second arm 60. A rear end of the link 65 is pivotably connected to the counter balance weight supporting link 50 on a point where the length of the link 50 from the point to the end connecting it with the rear end of the first arm 20 is the same as that of the second arm 60 from the point connecting it with the shaft 21 to its rear end. Thus, a four-link mechanism is formed by the link 65, the second arm 60, the first arm 20, and the link 50. Hereafter this four-link mechanism is referred as "small four-link mechanism". From the drawings, it can be clearly seen that the link 65 is spaced from and parallel to the first arm 20, and, the link 50 is spaced from and parallel to the second arm 60. By the small four-link mechanism, when the second arm 60 is pivoted and the relative angle between the first arm 20 and the second arm 60 is changed, the second arm 60 will move the link 65 to pivot the counter balance weight supporting link 50 to change the relative angle between the link 50 and the first arm 20.

By suitably choosing the size of the large and small four-link mechanism and the weight of the counter balance weight 51, the camera can be supported by the counter action of the counter balance weight 51, no matter to which location the camera is moved. This will be discussed in more detail later.

Now particularly referring to FIG. 1b, the distance between the shaft 21 and the connecting point of the rod 13 connecting with the base 10 is the same as that between the points where the rod 13 and the first arm 20 respectively connect with joint 30; thus, the base 10, the rod 13, the first arm 20 and the joint 30 form a four-link mechanism; hereafter, this four link mechanism is defined as "first auxiliary four-link mechanism".

Furthermore, the distance between the points where the rod 37 and the link 40 respectively connect with the joint 30 is the same as that between the points where the rod 37 and the link 40 respectively connect with the camera mounting bracket 70; thus, the rod 37, the link 40, the joint 30 and the camera mounting bracket 70 form another four-link mechanism; hereafter, this four-link mechanism is defined as "second auxiliary four-link mechanism".

Now refer to FIGS. 2a, 2b and FIG. 3a, 3b which respectively show the present invention in an extended and a retracted state. From these figures, it can be seen that by means of the first and second auxiliary four-link mechanisms, the horizontal orientation of the joint 30 and the camera mounting bracket 70 is always kept fixed, no matter whether the universal camera supporting jib is manipulated from a retracted state to an extended state or vice versa. This means that the camera can always be horizontally and stably rested on the camera mount bracket 70.

Moreover, the large and small four-link mechanisms are interacted to constitute a complete device for adjusting the position of the camera. For example, when the position of the camera is intended to be adjusted from the position as shown on FIG. 1b to the extended position as shown on FIG. 2b, a camera operator simply needs to move the camera mounting bracket 70 from the position shown on FIG. 1b forwards to the position shown on FIG. 2b. When he or she is doing so, the interior angle formed by the link 40 and the first arm 20 is increased, and the link 46 is moved forwards to pivot the second arm 60 counterclockwise about the shaft 21 to move the link 65 backwards to extend the counter balance weight 51 away from the base 10. Thus, the counter balance weight 51 can suitably balance the weight of the camera, since when the moment produce by the camera about the shaft 21 is increased (the camera being extended), the counter balance moment produced by the counter balance weight 51 about the shaft 21 is also increased (the counter balance weight being also extended). Alternatively, when the position of the camera is adjusted from the position as shown on FIG. 1b to FIG. 3b, the interior formed by the link 40 and the first arm 20 is decreased, and the link 46 is moved backwards to pivot the second arm 60 clockwise about the shaft 21 to move the link 65 forwards to retract the counter balance weight 51 toward the base 10. In this condition, the balance of the camera is also achieved since when the camera is retracted toward the base 10, the counter balance weight 51 is retracted, too.

Furthermore, due to the camera mounting bracket 70 being supported by a four-link mechanism, the up-and-down moving locus of the present camera can be a straight line, while such a moving locus of a prior crane camera can only be curve, since the camera thereof is mounted on the crane which is constructed in a manner like that of a seesaw.

Figure 4A:
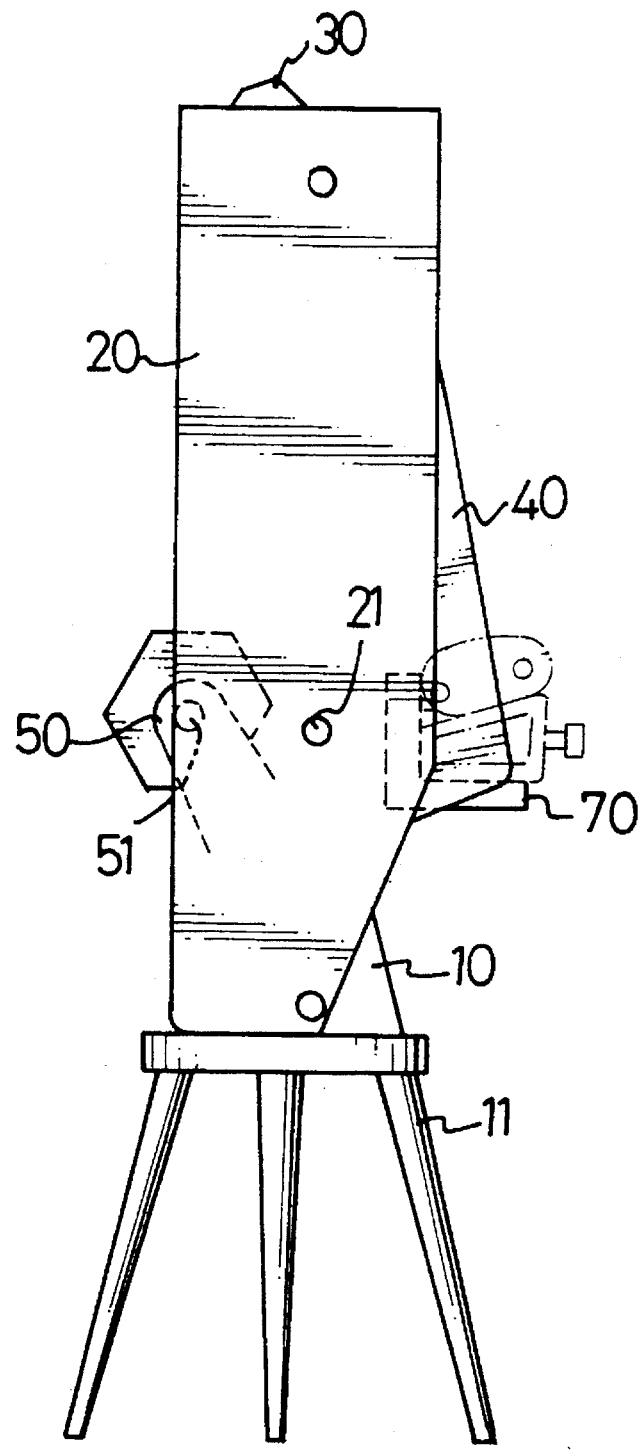
FIG. 4a is a view similar to FIG. 2a but showing the universal camera supporting jib in a wholly retracted configuration.
Figure 4B:
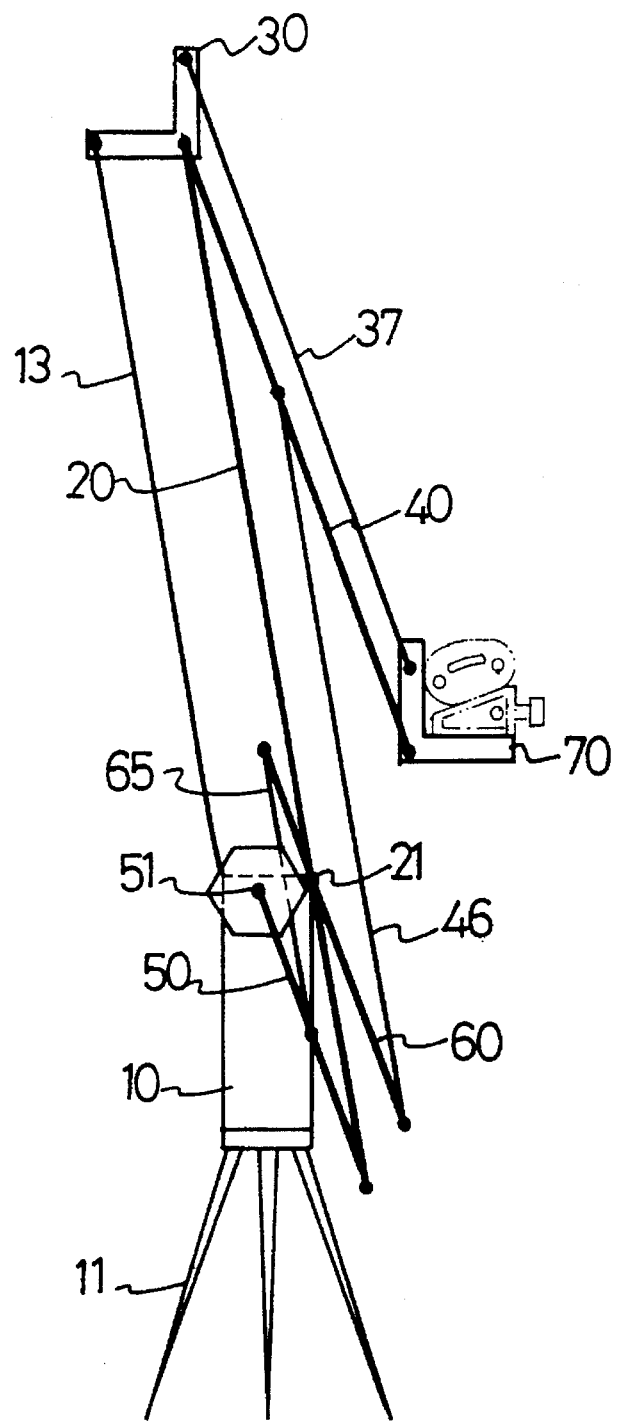
FIG. 4b is a diagrammatic view of FIG. 4a representing the structural Outline of the universal camera supporting jib.
Figure 5:
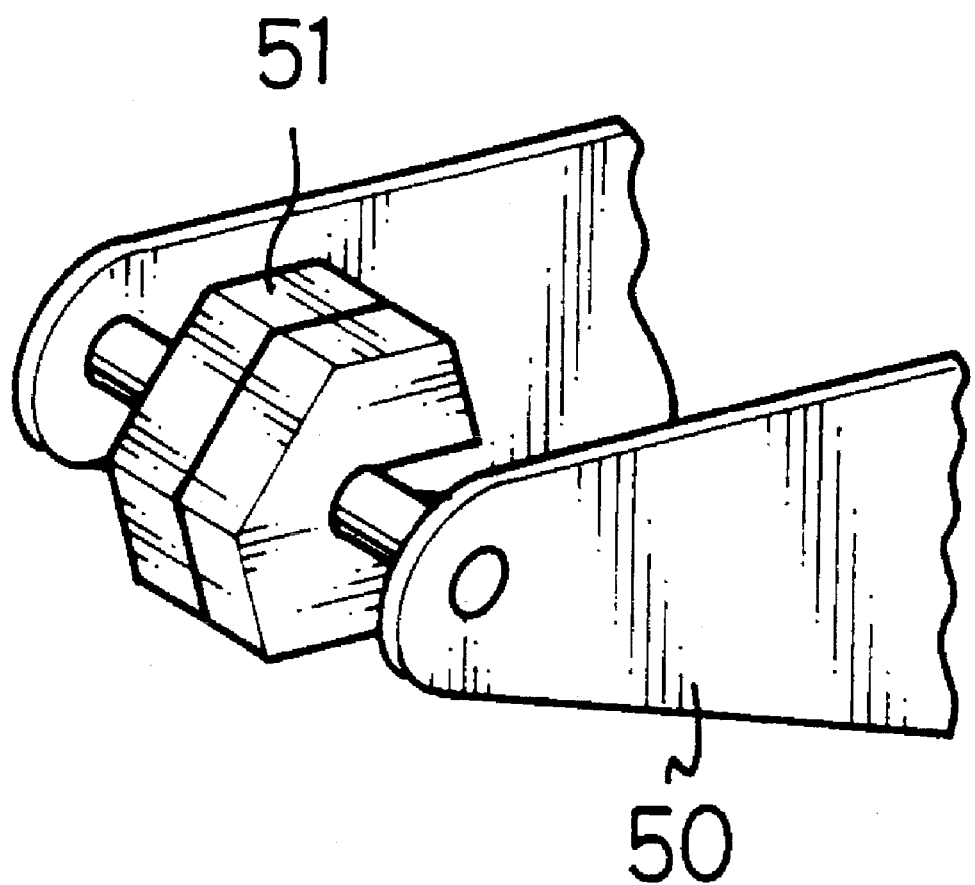
FIG. 5 is an enlarged perspective view showing the details of the counter balance weight of the universal camera supporting jib.

Now, referring to FIG. 4a and 4b, from these two figures, it can be seen that when the present universal camera supporting jib is wholly retracted, almost all of the elements of the four-link mechanisms can be received inside of the first arm 20; thus, the wholly retracted jib has a width substantially the same as that of the tripod 11 and has a height equal to the height of the tripod 11 adding the length of the first arm 20, whereby the present universal camera supporting jib can have a compact volume when it is wholly retracted to facilitate its storage and transportation. Turning to FIG. 5, it shows the details that the counter balance weight 51 is attached to the counter balance weight supporting link 50. The link 50 is composed of two plates which are fixedly connected with each other by a pin as shown on FIG. 5. The counter balance weight 51 is constructed to have a recess to facilitate it to be hanged on the pin. The counter balance weight 51 constitutes a plurality of separate blocks (in this embodiment, two blocks being shown) made of heavy material (for example, iron or steel). Thus, the weight of the counter balance weight is adjustable by adding or reducing the number of the blocks to meet the different weights of different cameras.

Additionally, although this is not shown on the drawings, it should be understood that the present invention can be equipped with power driven devices (for example, hydraulic cylinders or servo motors) to automatically manipulate the extension or retraction of the present universal camera supporting jib to adjust the position of the camera. Two power driven devices to respectively control the relative angle between the first arm 20 and the base 10 and the relative angle between the counter balance weight supporting link 50 and the first arm 20 are sufficient to manipulate the operation of the present invention.

Figure 6:
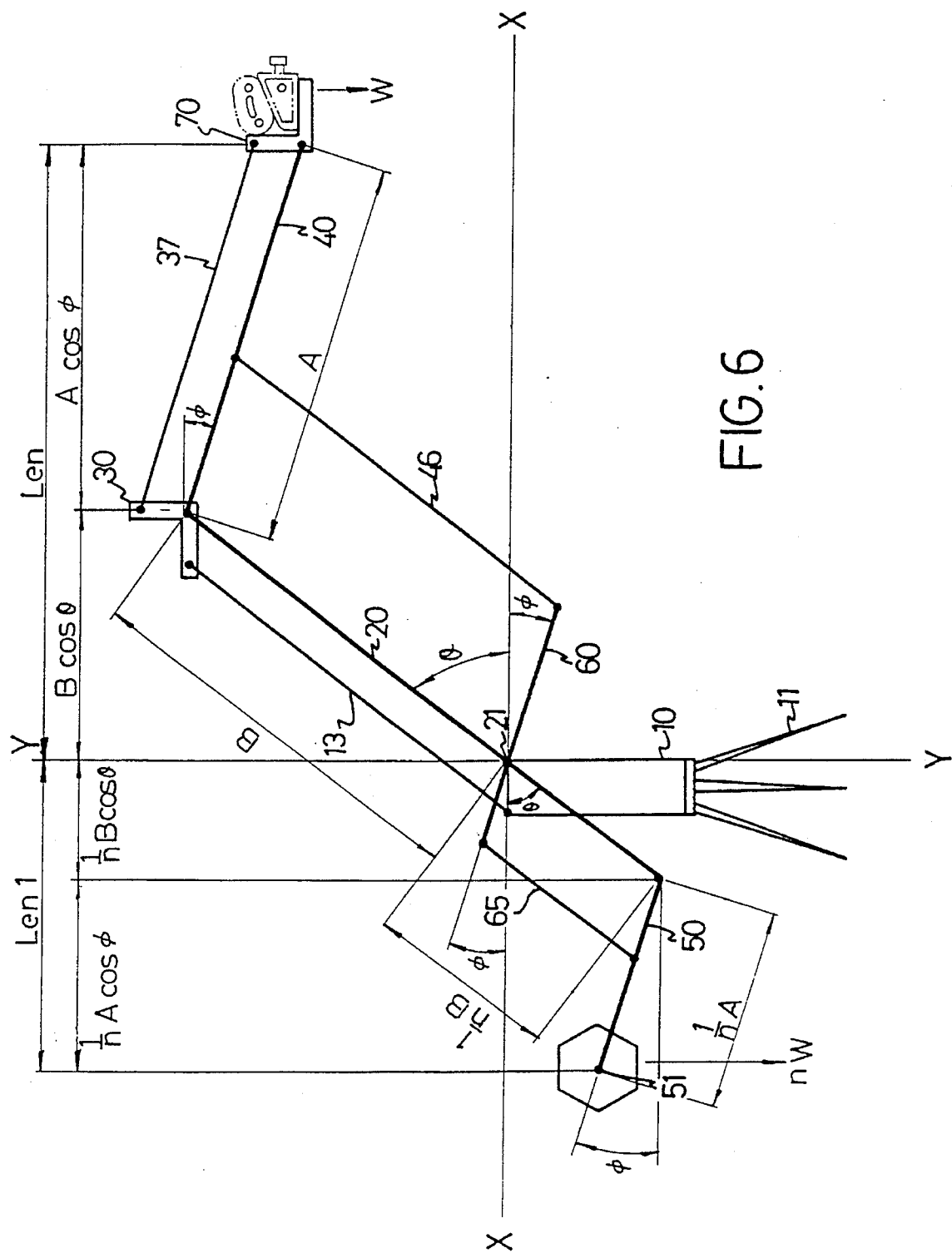
FIG. 6 is a view similar to FIG. 1b but some mathematical symbols are added thereto in order to facilitate the explanation of the operation of the present universal camera supporting jib.

To prove that the present invention can achieve the function that no matter where the camera is moved to which position, the counter balance weight 51 can balance the weight of the camera, FIG. 6 shows mathematical symbols to help the explanations, wherein an original point is set on the shaft 21 and a horizontal axis (X axis) and a vertical axis (Y axis) intersects through the shaft 21.

The definitions of the symbols are given in the following:

A: the length of the link 40;

B: the length of the first arm 20 from the point connecting it with the shaft 21 to the point connecting it with the joint 30;

n: a proportional constant which cannot be zero and preferable is a natural number no smaller than 2;

W: the weight of the camera;

$\theta$: the angle between the first arm 20 and the X axis;

$\phi$: the angle between the second arm 60 and the X axis;

A/n: the length of the counter balance weight supporting link 50;

B/n: the length of the first arm 20 between the point connecting it with the shaft 21 to the point connecting it with the link 50; and nW: the weight of the counter balance weight 51. From FIG. 6, it can be seen that the horizontal distance between the shaft 21 and the point that the rod 37 connects with the camera mounting bracket 70 is defined as "Len" which is equal to B cos $\theta$ plus A cos $\phi$. The mathematical expression thereof is:

$$\text{Len} = B \cos \theta + A \cos \phi \quad (1)$$

The horizontal distance between the rear end of the counter balance weight supporting link 50 and the shaft 21 is defined as "Len 1" which is equal to (B cos $\theta$)/n plus (A cos $\phi$)/n. The mathematical expression thereof is:

$$\text{Len } 1 = (B \cos \theta)/n + (A \cos \phi)/n \quad (2)$$

Substituting equation (1) into equation (2), we can obtain a third equation:

$$\text{Len } 1 = \text{Len}/n \quad (3)$$

From equation (3), it can be seen that the Len is proportional to the Len 1 by the proportional constant n. This means no matter how the angles $\theta$ and $\phi$ change, the relationship between the moment arms of the camera and the counter balance weight about the shaft 21 is constant. Here please note that in these equations the weights of the elements constituting the four-link mechanisms, including the camera mounting bracket 70, are neglected. Furthermore, the horizontal distance between the weight center of the camera to the point where the bracket 70 connects with the rod 37 is neglected, and the horizontal distance between the weight center of the counter balance weight 51 to the rear end of the link 50 is also neglected.

Provided that the moment produced by the weight of the camera about the shaft 21 equal or substantially equal to that produced by the weight of the counter balance weight 51 about the shaft 21, the camera can be deliberately adjusted to any desired position and kept balanced and fixed thereon by the counter action of the counter balance weight 51.

The moment produced by the weight of the camera about the shaft 21 is W×Len . . . (4)

The moment produced by the weight of the counter balance weight 51 about the shaft 21 is nW×Len 1 . . . (5)

Substituting equation (3) into equation (5), we obtain another equation:

$$nW \times [(\text{Len})/n] = W \times \text{Len} \quad (6).$$

From equations (4) and (6), it can be clearly seen that the moment produced by the weight of the camera about the shaft 21 equal to the moment produced by the weight of the counter balance weight 51 about the shaft 21, and from a understanding of FIG. 6 these two moments are acting on the shaft 21 on different directions (i.e., the former being clockwise and the latter being counterclockwise); thus, the balance between the camera and the counter balance weight 51 is obtained.

Although the invention has been explained in relation to its preferred embodiment, it is to be understood that many other possible modifications and variations can be made without departing from the spirit and scope of the invention as hereinafter claimed.

I claim:

1. A universal camera supporting jib for supporting a video camera or the like, comprising:

a first arm;

a second arm;

a shaft pivotably connecting with the first arm and the second arm and dividing them into a first portion and a second portion, respectively;

a first four-link mechanism comprising the first portion of the first arm and second arm;

a second four-link mechanism comprising the second portion of the first arm and second arm;

a base means connected with the shaft for supporting the two four-link mechanisms;

a camera receiving means attached to the first four-link mechanism for receiving a camera, the camera receiving means being attached to a first end of a first link of the first four-link mechanism in which the first link is spaced from and parallel to the second arm and the first end is other than the end that the first link connects with the first arm, and wherein the counter balance weight is attached to a second end of a second link of the second four-link mechanism in which the second link is spaced from and parallel to the second arm and the second end is other than the end that the second link connects with the first arm;

a counter balance weight attached to the second four-link mechanism for balancing the moment produced by weight of the camera about the shaft and a joint, a first rod connecting the joint with the base, and a second rod connecting the joint with the camera receiving means, wherein a third four-link mechanism is formed by the base, the joint, the first portion of the first arm and the first rod, and a fourth four-link mechanism is formed by the joint, the first link, the camera receiving means and the second rod.

2. The universal camera supporting jib according to claim 1, wherein when a camera is received onto the camera receiving means, the moments produced by the weight of the camera and the weight of the counter balance weight about the shaft are substantially the same to each other and have different acting directions, whereby a balanced state is obtainable between the camera and the counter balance weight.

3. The universal camera supporting jib according to claim 1, wherein the base means comprises a base fixedly connected with the shaft and a tripod rotatably attached to the base.

4. The universal camera supporting jib according to claim 1, wherein the weight of the counter balance weight is adjustable.

5. The universal camera supporting jib according to claim 1, further comprising a power driven device to control the relative angle between the base and the first arm and the relative angle between the first arm and the second link.

6. The universal camera supporting jib according to claim 5, wherein the power driven device comprises two hydraulic cylinders or two servo motors.

* * * * *